United States Patent [19]
Fukahori et al.

[11] Patent Number: 4,461,796
[45] Date of Patent: Jul. 24, 1984

[54] SOUND DAMPING MATERIALS

[75] Inventors: Yoshihide Fukahori, Hachioji; Yasuhiro Morimura, Kunitachi; Ryota Fujio, Akigawa; Yukio Fukuura, Kawagoe, all of Japan

[73] Assignee: Bridgestone Tire Company Limited, Tokyo, Japan

[21] Appl. No.: 511,062

[22] Filed: Jul. 5, 1983

[30] Foreign Application Priority Data

Jul. 6, 1982 [JP] Japan .................. 57-116198

[51] Int. Cl.³ .............................. B32B 3/12
[52] U.S. Cl. ................... 428/116; 428/117
[58] Field of Search ............ 428/116, 117, 463, 118

[56] References Cited
U.S. PATENT DOCUMENTS

| | | | |
|---|---|---|---|
| 3,087,568 | 4/1963 | Kurtze | 428/120 X |
| 3,087,571 | 4/1963 | Kerwin, Jr. | 428/116 X |
| 3,160,549 | 12/1964 | Caldwell et al. | 428/40 X |
| 3,432,859 | 3/1969 | Jordan et al. | 428/116 X |

Primary Examiner—Henry F. Epstein
Attorney, Agent, or Firm—Sughrue, Mion, Zinn, Macpeak and Seas

[57] ABSTRACT

A sound damping material is disclosed, which is a composite structural body comprising honeycomb or corrugated core, plain sheet and pressure sensitive adhesive layer, a height direction of the honeycomb or corrugated core being perpendicular to a surface of a vibrating body. In this sound damping material, one pressure sensitive adhesive layer is at least existent between the honeycomb or corrugated cores or between the honeycomb or corrugated core and the plain sheet.

6 Claims, 17 Drawing Figures

FIG_6

FIG_7

FIG_8

FIG.10

SOUND DAMPING MATERIALS

BACKGROUND OF THE INVENTION

1. Field of the Invention

This invention relates to a composite structural body comprising a honeycomb or corrugated core, a plain sheet and a pressure sensitive adhesive layer, and more particularly to a novel and practical sound damping material which is characterized by directly applying a pressure sensitive adhesive layer to one or both surfaces of a honeycomb or corrugated core and has an excellent damping performance over a wide frequency range and is very small in the temperature dependence and suitable for weight-saving and cost reduction.

2. Description of the Prior Art

With the spread of vehicles such as automobiles, trains, airplanes and the like as well as office machines, electric appliances and so on, a countermeasure for reduction of noise generated by these devices is needed. As a result, it is well-known that many sound damping materials are patented and on the market now.

In order to use these sound damping materials against the instrument or equipment which is the noise source, it is practically required to have the following conditions:

(1) the damping effect is large at low and middle frequency ranges;
(2) the damping effect does not reduce over a wide temperature range; and
(3) the weight is as light as possible and the cost is low.

As to condition (1), an oscillation frequency in many apparatus, instruments and equipments requiring noise control is not more than 1,000 Hz (*Noise Control Handbook*, Associate of Japanese Acoustic Material, pp. 97-171), and particularly it is within a range of dozens to several hundreds Hz in the automobiles and the like. Concerning condition (2), these apparatus and the like are frequently used over a wide temperature range, for example, from a low temperature near 0° C., to 60°-80° C., sometimes a high temperature of around 100° C., so that it is naturally desired to develop a satisfactory damping effect at such a temperature range. As to condition (3), it is important to lighten the total weight of the apparatus such as automobile or the like as far as possible in view of energy-saving and cost reduction.

In conventional sound damping materials, particularly sound damping sheets, the damping effect per unit weight is low and the temperature dependence of the damping performance is large, especially the damping effect at a high temperature range largely reduces (see Comparative Example 4 as mentioned later). Therefore, they are considerably restricted in their application range against the above mentioned conditions at present.

SUMMARY OF THE INVENTION

Given the above circumstances, the inventors have made studies with respect to noise control and succeeded in inventing a new type sound damping materials entirely different from the conventional one. That is, the sound damping material according to the invention is characterized by utilizing a synergistic action of an effect based on structural characteristics of honeycomb or corrugated core and an effect of a thin pressure sensitive adhesive layer inserted between the honeycomb or corrugated cores or between the honeycomb or corrugated core and the other solid plain sheet.

DETAILED DESCRIPTION OF THE INVENTION

As is well-known, honeycomb or corrugated structural bodies are light in weight and are widely used as a high rigid construction. For this purpose, it is premised that honeycomb or corrugated cores, or honeycomb or corrugated core and plain sheet are strongly bonded to each other with an adhesive. Therefore, the feature of applying a pressure sensitive adhesive to the bonded portion instead of the adhesive is opposed to the above purpose of the honeycomb or corrugated structural body and is not usually employed. In such a commercially available honeycomb or corrugated structural body, it is naturally apparent that the development of damping effect is hardly expected unless a specific material having a high damping performance is used as a honeycomb or corrugated core or the other solid plain sheet (see Comparative Examples 1 and 5 as mentioned later).

On the other hand, in the case of a constrained-type damping material obtained by inserting a pressure sensitive adhesive between solid plain sheets, the damping effect is not too large unless the solid plain sheet is fairly heavy (see Comparative Examples 2 and 6 as mentioned later).

In the case of a composite structural body comprising a honeycomb or corrugated core, a plain sheet and a pressure sensitive adhesive layer according to the invention (hereinafter referred to as a honeycomb or corrugated tack structure), although the honeycomb or corrugated core, the plain sheet and the pressure sensitive adhesive layer themselves have a small damping effect as previously described, the damping effect is much higher than that expected from the total effect of these components, that, is, it is a synergistic effect (see Examples 1, 12 and 13 as mentioned later).

In order to develop such a synergistic damping effect, it is essential that at least one pressure sensitive adhesive layer is existent between the honeycomb or corrugated cores or between the honeycomb or corrugated core and the plain sheet. If the pressure sensitive adhesive layer does not directly contact the honeycomb or corrugated core, for example, when the pressure sensitive adhesive layer is existent between two plain sheets and the honeycomb or corrugated core is bonded to another honeycomb or corrugated core or the plain sheet with an adhesive, the synergistic damping effect is not developed (see Comparative Examples 3 and 7 as mentioned later).

According to the invention, it is most desirable that the pressure sensitive adhesive layer to be inserted between the honeycomb or corrugated cores or between the honeycomb or corrugated core and the plain sheet is constructed with only the pressure sensitive adhesive. However, even if a part of the pressure sensitive adhesive layer is replaced with an adhesive, the improved damping effect is retained sufficiently (see Example 11 as mentioned later). In this case, it is necessary that a surface ratio of the pressure sensitive adhesive to the adhesive is not less than ⅓, preferably not less than 1/1, more particularly not less than 2/1.

The thus obtained sound damping materials according to the invention not only develop an excellent damping effect at low and middle frequency ranges of not more than 1,000 Hz, which are most important in noise control, but also are small in temperature dependence of the damping effect. Particularly it is surprising that the improved damping effect is maintained up to a fairly high temperature, so that they are clearly and fundamentally different from the conventional sound damping material.

Furthermore, the sound damping material according to the invention consists mainly of the honeycomb or corrugated core being hollow in the interior, so that weight-saving is easy and also the reduction of cost can sufficiently be achieved by properly selecting the material of the honeycomb or corrugated core. Moreover, the sound absorption property and sound insulation property can naturally be expected by utilizing the hollowability of the honeycomb or corrugated core.

The honeycomb tack structure according to the invention is a general term for composite structural bodies formed by the combination of single or plural honeycomb cores, solid plain sheets and pressure sensitive adhesive layers and fundamentally has no limitation in the shape (e.g. circle, hexagon or the like), size (i.e. cell size) and height of the honeycomb core, and the shape, thickness and appearance of the plain sheet.

As a material for the formation of the honeycomb core, use may be made of paper, asbestos paper, plastic, polyurethane, FRP and metal such as aluminum, iron, copper and the like. In the honeycomb core, the height of the core is desirable to be not less than 1 mm, preferably not less than 2 mm and in this case, the larger the height, the better the damping effect. Furthermore, the cell size of the honeycomb core is desirable to be $1 \sim 100$ mm, preferably $2 \sim 50$ mm.

The corrugated tack structure according to the invention is a general term for composite structural bodies formed by the combination of single or plural corrugated cores, solid plain sheets and pressure sensitive adhesive layers (edited by Japanese Patent Office, "Laminate Technics viewed from Patents"). A typical example of the corrugated core is shown in FIGS. 2a to 2h.

As a material for the formation of the corrugated core, use may be made of paper, asbestos paper, plastic, polyurethane, FRP and metal such as aluminum, iron, copper and the like. In the corrugated core, the height of the core is desirable to be 1 mm $\sim$ 100 mm, preferably 1 mm $\sim$ 50 mm. Furthermore, the number of ridges in the corrugated core is desirable to be $30 \sim 500$/m, preferably $50 \sim 350$/m.

As a material for the plain sheet, use may be made of paper, asbestos paper, rubber sheet, plastic thin sheet, FRP thin sheet, metal thin sheet such as aluminum plate, iron plate, copper plate or the like slate, ordinary decorative plate and so on.

According to the invention, a weight ratio of plain sheet to honeycomb or corrugated core is desirable to be $1/30 \sim 100$, preferably $1/20 \sim 50$. Moreover, a proper number of apertures (aperture ratio of not more than 30%) may be pierced in the plain sheet in order to enhance the sound absorbing effect, and in this case the damping effect in not damaged.

The term "pressure sensitive adhesive" used herein means ordinary pressure sensitive adhesives having a specified tackiness at a service temperature and a service time. These pressure sensitive adhesives may be used in the form of double-coated tape or thin film. According to the invention, the pressure sensitive adhesive is desirable to have a dynamic shearing storage modulus (G') at 25° C. and 15 Hz of $1 \times 10^3 \sim 1 \times 10^7$ dyn/cm$^2$, preferably $5 \times 10^3 \sim 5 \times 10^6$ dyn/cm$^2$, and particularly the change of G' is necessary to be small in the service time. Further, the thickness of the pressure sensitive adhesive layer is desirable to be $30 \sim 1 \times 10^4$ μm, preferably $50 \sim 5 \times 10^3$ μm. In general, the larger the thickness, the better the damping effect.

As the pressure sensitive adhesive, use may be made of rubber type pressure sensitive adhesives such as natural rubber, polyisoprene rubber, styrene-butadiene rubber, styrene-butadiene copolymer, styrene-isoprene copolymer, butyl rubber, polyisobutylene rubber, silicone rubber, chloroprene rubber, nitrile rubber, polyisobutyl ether, reclaimed rubber, graft rubber and the like; acryl type pressure sensitive adhesives functionally comprising a tackifying component (main monomer) such as acrylic alkyl ester or methacrylic alkyl ester with a carbon number of 4–12, a coalescing component (comonomer) such as acrylic alkyl ester or methacrylic alkyl ester with a carbon number of 1–4, vinyl acetate, styrene, acrylonitrile and other copolymerizable monomer, and a modifying component (functional group-containing monomer) such as carboxylic acid, e.g. acrylic acid or methacrylic acid, hydroxyl group-containing monomer, acid amide or the like; EVA type, polyurethane type pressure sensitive adhesives and so on. Of course, it does not matter that these pressure sensitive adhesives may be crosslinking type or non-crosslinking type. Under a special condition as high service temperature, hot-melt type becomes effective.

Moreover, organic or inorganic soft materials having the dynamic shearing storage modulus as defined above, such as unvulcanized rubber, vulcanized rubber, foamed body, asphalt, clay and the like may be used instead of the above pressure sensitive adhesive without departing from the scope of the invention.

According to the invention, a general adhesive, hot melt adhesive or the like may be applied to bond surfaces between the honeycomb or corrugated cores or between the honeycomb or corrugated core and the solid plain sheet using no pressure sensitive adhesive. Moreover, the bonding between the honeycomb or corrugated tack structure and the vibration source may be performed by using any type of pressure sensitive adhesive and adhesive.

The sound damping materials according to the invention can be used without damaging the damping performance even after being subjected to an impregnation or other treatment in order to improve, for example, flame retardant properties, weather resistance and durability, and to repel water or oil and further to make the appearance beautiful.

In order to further improve sound absorbing property, sound insulation property and heat insulation property of the honeycomb or corrugated tack structure according to the invention, a filler such as polyurethane foam or other plastic foam, glass wool, rock wool, sawdust, wood chip, inorganic or organic powder or the like may be filled in the honeycomb or corrugated core, and in this case the damping effect may rather be improved.

Since the sound damping materials according to the invention have excellent properties as mentioned above, they are widely applied as a sound damping absorbing and insulating material to roof, floor, sidewall, bonnet or the like in vehicles such as automobile, train, airplane, shipping and so on, or to noise sources in industrial machines such as building machine, agricultural machine, construction machine and so on or in factory parts such as metal processing machine, duct, hopper, chute and the like or in roof (particularly, iron plate roof), ceiling, floor, wall and the like of residence and office, or to office machines such as computer, printer and the like, household electric machines such as electric washing machine, vacuum cleaner and the like, acoustic systems such as stereo system, record player and the like, piano, organ and so on.

The following examples are given in illustration of the invention and are not intended as limitations thereof.

EXAMPLE 1, COMPARATIVE EXAMPLES 1-3

A sound damping material as shown in the following Table 1 was bonded to a galvanized iron sheet having a thickness of 1 mm, a width of 35 mm and a length of 400 mm with a general-purpose industrial adhesive, Cemedine 575 (tradename) to form a specimen and a loss factor ($\eta$) of the specimen was measured at 30° C. by a mechanical impedance method.

Here, the loss factor is a value exhibiting a standard of the damping performance, and the larger the value of the loss factor, the better the damping effect. In the sound damping material, the loss factor is generally desirable to be $\eta \geq 0.05$ (particularly $\eta \geq 0.1$).

Figure 1:
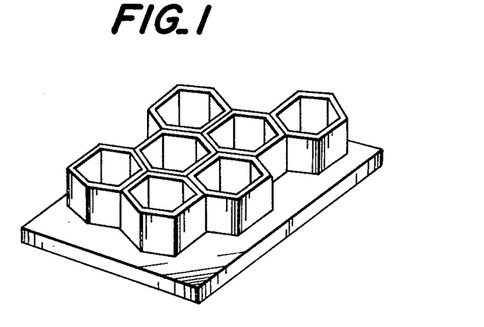
FIG. 1 is a perspective view illustrating a method of bonding a honeycomb core to a vibrating body according to the invention.
Figure 2A:
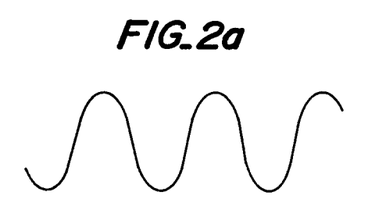
FIGS. 2a to 2h are perspective views illustrating various embodiments of the corrugated core according to the invention, respectively.
Figure 2B:
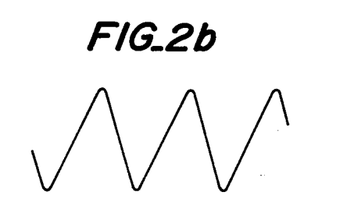
Figure 2C:
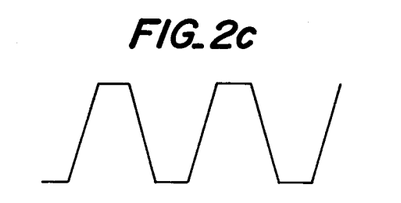
Figure 2D:
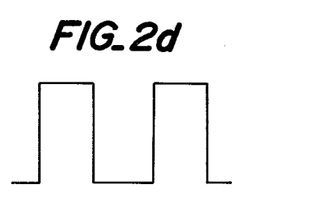
Figure 2E:
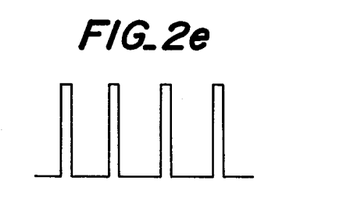
Figure 2F:
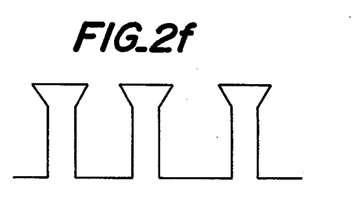
Figure 2G:
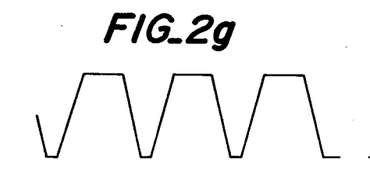
Figure 2H:
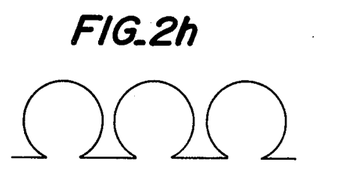

A thin film of pressure sensitive adhesive (hereinafter referred to as a tack film) used in this example was a butyl rubber type pressure sensitive adhesive having a thickness of 200$\mu$ (butyl rubber/polybutene=100/300, dynamic shearing storage modulus (G') at 25° C. and 15 Hz=$2 \times 10^6$ dyn/cm$^2$ as measured by a mechanical spectrometer made by Rheometrix Corp.). As a honeycomb core was used a circular paper honeycomb core made by Shin Nippon Core Kabushiki Kaisha. In Example 1 and Comparative Examples 1 and 3, the bonding between the sound damping material and the iron plate was made as shown in FIG. 1.

TABLE 1

| | Construction of sound damping material[1] | Weight of material (kg/m$^2$) | Honeycomb core cell size (mm) | height (mm) |
|---|---|---|---|---|
| Example 1 | core[2] * tack film — core * paper[3] | 1.07 | 15 | 10 |
| Comparative Example 1 | core * paper | 1.00 | 15 | 20 |
| Comparative Example 2 | paper — tack film — paper | 0.93 | — | — |
| Comparative Example 3 | core * paper — tack film — paper * core * paper | 1.70 | 15 | 10 |

Note:
[1]The leftmost part of the sound damping material is bonded to the galvanized iron plate.
The term "core" means a paper honeycomb core.
[3]The term "paper" has a thickness of 0.5 mm.
The symbol "*" shows the bonding between parts with a synthetic paste, Arabic Yamato (trade name) made by Yamato Kabushiki Kaisha.

Figure 3:
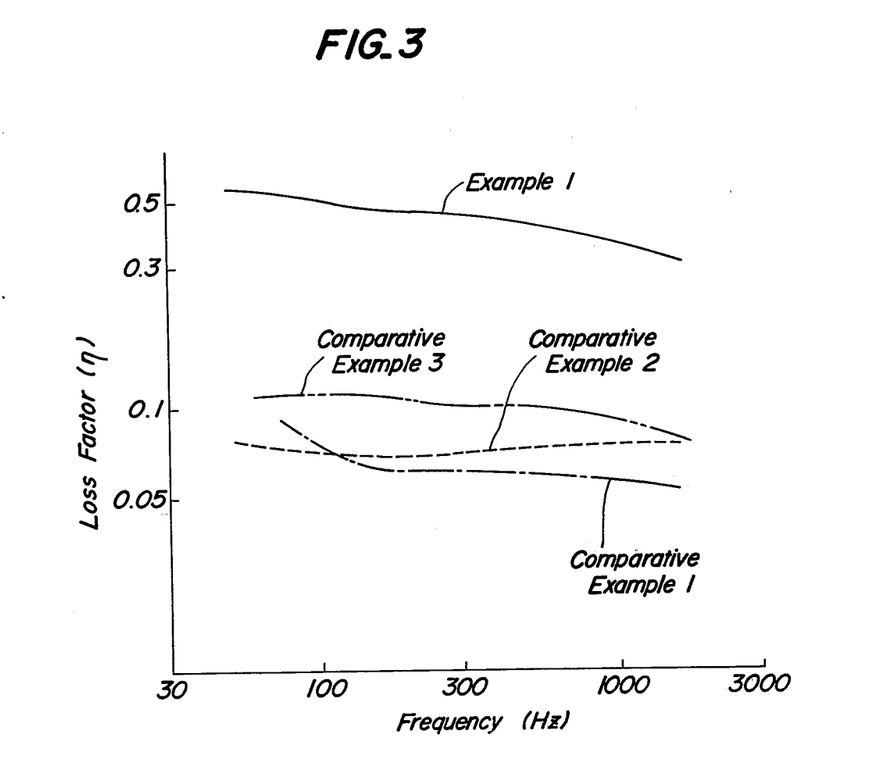
FIGS. 3 to 6 are graphs showing a relation between frequency and loss factor at 30° C., respectively.

The thus obtained results for the loss factor are shown in FIG. 3 as a function of frequency. As apparent from FIG. 3, the sound damping material according to the invention (Example 1) surprisingly improves the loss factor, which clearly shows the synergistic effect resulting from the special combination of the honeycomb core and the pressure sensitive adhesive, whereas the conventional honeycomb construction obtained by bonding the honeycomb core to the paper with the adhesive (Comparative Example 1) and the constrained-type construction obtained by bonding two papers through the tack film without the honeycomb core (Comparative Example 2) do show only a low level of damping effect. Moreover, the damping effect is not substantially improved in the case that the tack film does not directly contact with the honeycomb core (Comparative Example 3).

EXAMPLES 2-4

Figure 4:
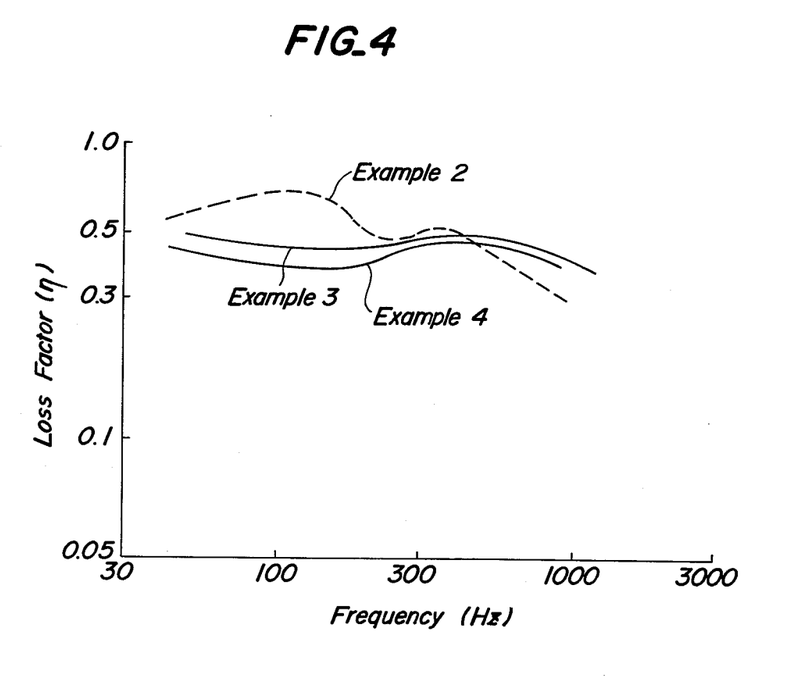

A sound damping material as shown in the following Table 2 was measured with respect to the loss factor under the same conditions as described in Example 1 to obtain a result as shown in FIG. 4. As apparent from FIG. 4, the excellent damping effect was obtained irrespective of the kind of the plain sheet used (veneer, corrugated board, aluminum foil).

TABLE 2

| | Construction of sound damping material | Weight of material (kg/m$^2$) | Honeycomb core cell size (mm) | height (mm) |
|---|---|---|---|---|
| Example 2 | core — tack film — veneer | 1.86 | 15 | 10 |
| Example 3 | core — tack film — corrugated board | 1.62 | 15 | 10 |
| Example 4 | core — tack film — aluminum foil | 0.75 | 15 | 10 |

EXAMPLES 5-6

Figure 5:
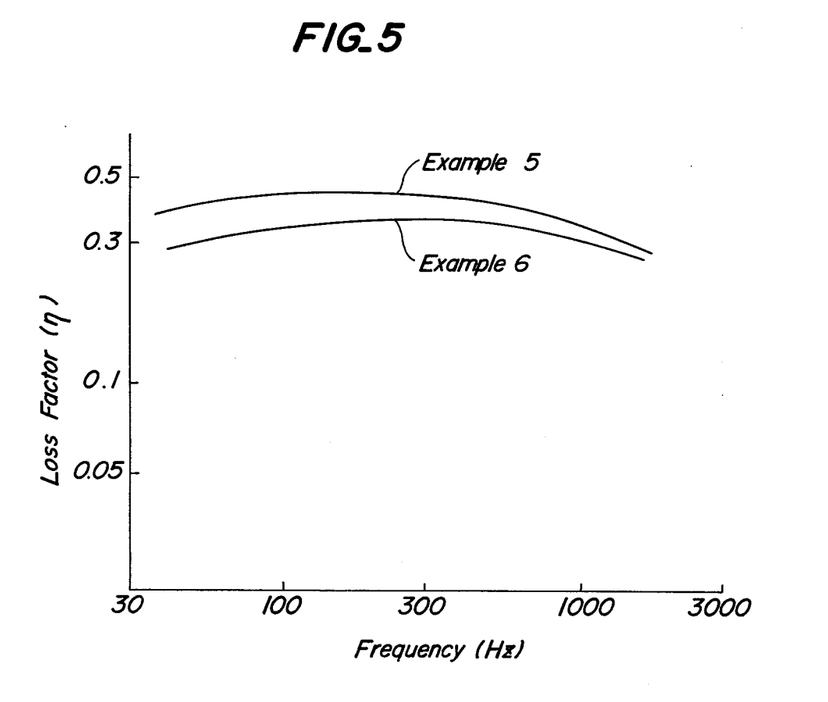

The loss factor was measured in the same manner as described in Example 1 by changing the kind of the honeycomb core as shown in the following Table 3 to obtain a result as shown in FIG. 5. As apparent from FIG. 5, the excellent damping effect was obtained irrespective of the kind of the honeycomb core used.

TABLE 3

| | Construction of sound damping material | Weight of material (kg/m$^2$) | Honeycomb core cell size (mm) | height (mm) |
|---|---|---|---|---|
| Example 5 | honeycomb core of hard vinyl chloride — tack film — paper | 1.10 | 8 | 10 |
| Example 6 | almuminum honeycomb core — tack film — paper | 1.01 | 12 | 10 |

EXAMPLES 7-8

Figure 6:
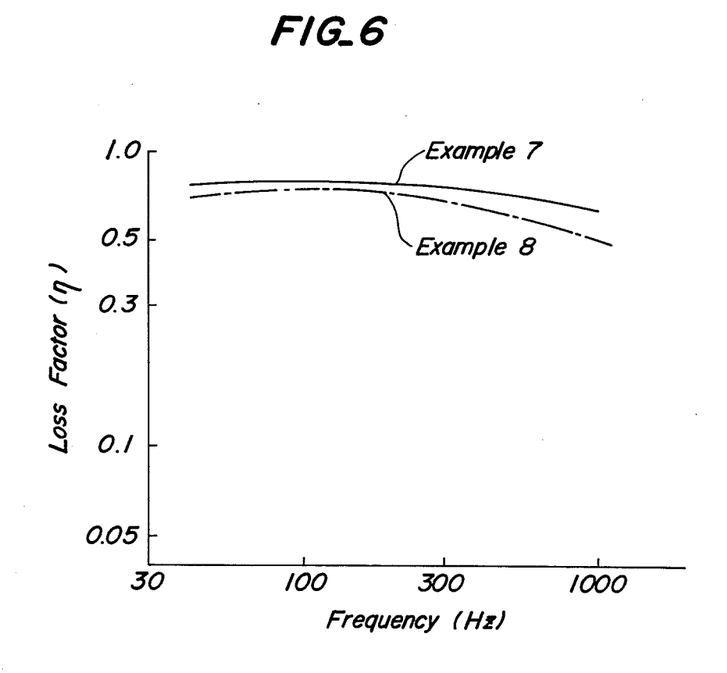

The loss factor was measured in the same manner as described in Example 1 by making the weight of the plain sheet somewhat heavier (i.e. use of iron plate with a thickness of 0.5 mm) or the thickness of the tack film somewhat thicker (i.e. thickness of tack film=1 mm) as shown in the following Table 4 to obtain a result as shown in FIG. 6. As apparent from FIG. 6, the loss factor is fairly increased with the increase of the plain sheet weight or the tack film thickness.

TABLE 4

| | Construction of sound damping material | Weight of material (kg/m$^2$) | Honeycomb core cell size (mm) | height (mm) |
|---|---|---|---|---|
| Example 7 | tack film — core — tack film — iron plate (0.5 mm) | 4.76 | 15 | 10 |
| Example 8 | core — tack film (1 mm) — core — paper | 1.94 | 15 | 10 |

EXAMPLE 9, COMPARATIVE EXAMPLE 4

Figure 7:
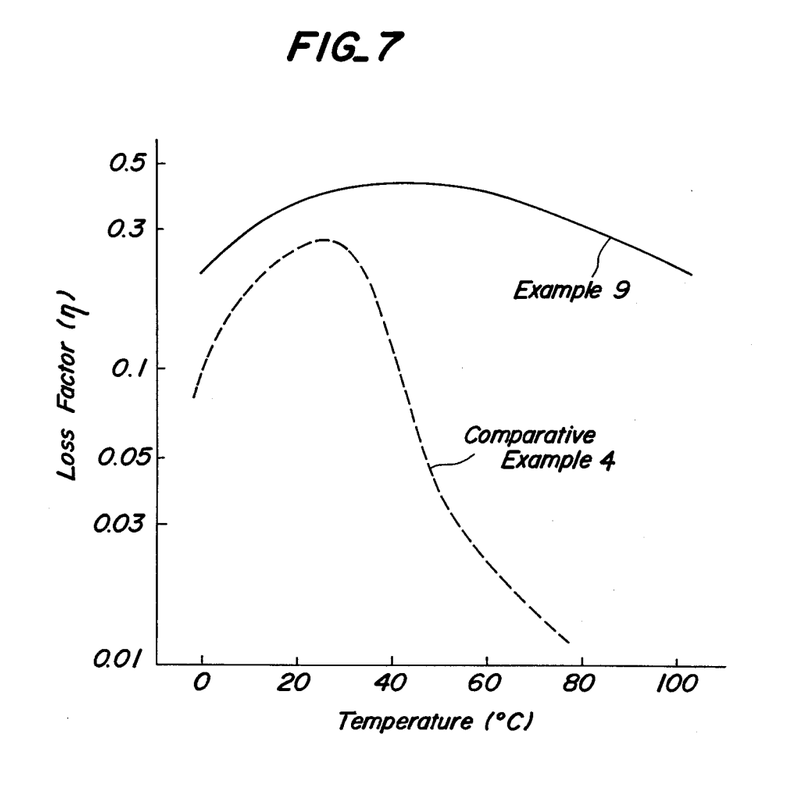
FIG. 7 is a graph showing a relation between temperature and loss factor at 500 Hz.

The temperature dependence of loss factor at 500 Hz was measured with respect to the sound damping material having the same construction as used in Example 1 (Example 9) and the commercially available sound damping material (mica-containing vinyl chloride sheet of 2 mm thick, made by Bridgestone Tire Co., Ltd., Comparative Example 4) to obtain a result as shown in FIG. 7.

In Comparative Example 4, the reduction of the loss factor is conspicuous at a higher temperature in spite of its heavy weight (3.6 kg/m$^2$). That is, the sound damping material of Comparative Example 4 exhibits a strong temperature dependence of the damping effect.

On the other hand, the sound damping material according to the invention (Example 9) is not only high in the loss factor at room temperature but also very small in the reduction of loss factor at a higher temperature in spite of its light weight (1.07 kg/m$^2$).

EXAMPLES 10-11

A sound pressure level was measured with respect to an iron plate having a thickness of 1 mm, a width of 420 mm and a length of 670 mm when this plate was vibrated at room temperature (30° C.). Then, the sound pressure level was measured for two samples where the following sound damping materials according to the invention were bonded to the same iron plate as described above under the same experimental condition. The first sound damping material (Example 10) was the same as used in Example 7, while the second one (Example 11) was obtained by replacing a part (14% as an area) of the tack film in the sound damping material of Example 10 with an adhesive (Cemedine 575). The results thus obtained are shown in FIG. 8.

Figure 8:
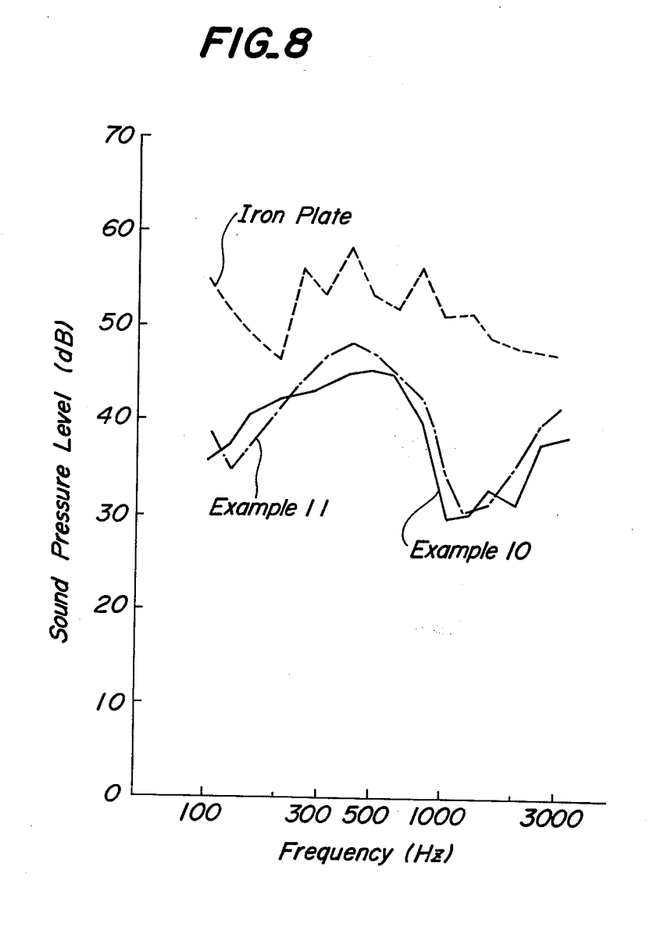
FIG. 8 is a graph showing a relation between sound pressure level and frequency.

As apparent from FIG. 8, the sound damping materials according to the invention (Examples 10, 11) exhibit an excellent damping effect. Further, it is understood that even if a part of the tack film is replaced with the adhesive, there is only a slight difference in the damping effect.

EXAMPLE 12, COMPARATIVE EXAMPLES 5-6

A sound damping material as shown in the following Table 5 was bonded to a galvanized iron sheet having a thickness of 1 mm, a width of 35 mm and a length of 400 mm with a general-purpose industrial adhesive, Cemedine 575 (tradename) to form a specimen and a loss factor ($\eta$) of the specimen was measured at 30° C. by a mechanical impedance method.

Here, the loss factor is a value exhibiting a standard of the damping performance, and the larger the value of the loss factor, the better the damping effect. In the sound damping material, the loss factor is generally desirable to be $\eta \geq 0.05$ (particularly $\eta \geq 0.1$).

A thin film of pressure sensitive adhesive (hereinafter referred to as a tack film) used in this example was a butyl rubber type pressure sensitive adhesive having a thickness of 250$\mu$ (butyl rubber/polybutene=100/300, dynamic shearing storage modulus (G') at 25° C. and 15 Hz=2.5×10$^6$ dyn/cm$^2$ as measured by a mechanical spectrometer made by Rheometrix Corp.). As a corrugated core was used a paper corrugated core having a height of 4 mm, number of ridges of 120/m and a paper thickness of 0.4 mm.

TABLE 5

| | Construction of sound damping material[1] |
|---|---|
| Example 12 | thin paper — core[2] — tack film — core — thin paper[3] |
| Comparative Example 5 | thin paper — core — thin paper — core — thin paper |
| Comparative | compressed paper[4] — tack film — compressed paper |

TABLE 5-continued

Construction of sound damping material[1]

Example
6

Note:
[1] The leftmost part of the sound damping material is bonded to the galvanized iron plate.
[2] The term "core" means the corrugated core as mentioned above.
[3] The term "thin paper" has a thickness of 0.4 mm.
[4] The term "compressed paper" means a thin laminated body obtained by pressing construction of thin paper ± core ± thin paper by means of a hot press.
The symbol "*" shows the bonding between parts with a synthetic paste, Arabic Yamato (trade name) made by Yamato Kabushiki Kaisha.

Figure 9:
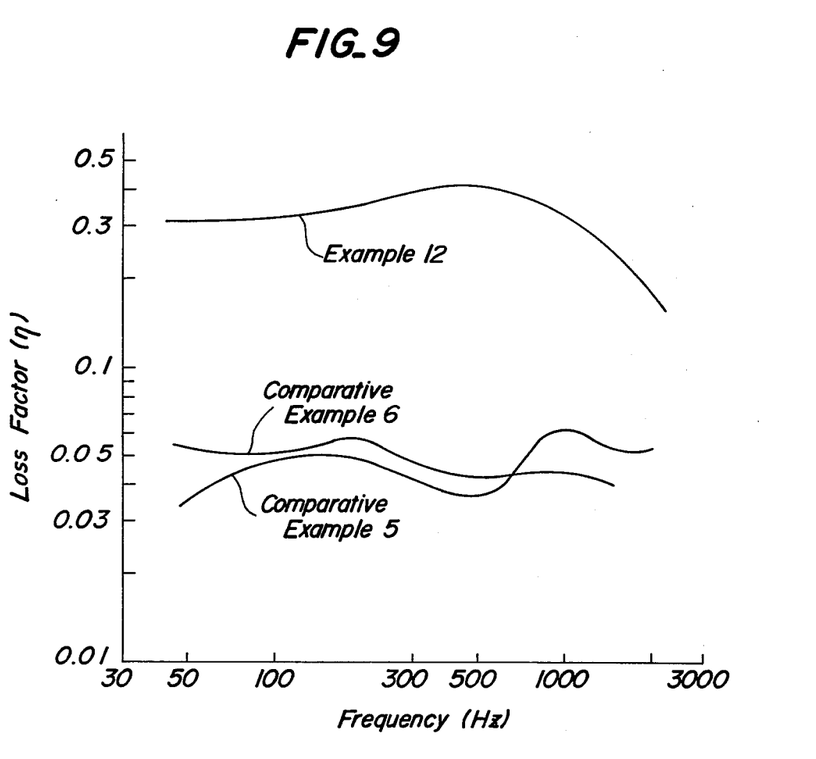
FIGS. 9 and 10 are graphs showing a relation between frequency and loss factor at 30° C., respectively.

The thus obtained results for the loss factor are shown in FIG. 9 as a function frequency. As apparent from FIG. 9, the conventional sound damping material obtained by bonding two cores to each other with the adhesive (Comparative Example 5) and the special structure obtained by inserting tack film between two compressed papers having the same weight (Comparative Example 6) have a loss factor of $\eta$=about 0.05, while the corrugated tack structure according to the invention obtained by combining both the above structures (Example 12) has a loss factor of $\eta = 0.3 \sim 0.4$ at a frequency of not more than 1,000 Hz and clearly exhibits the snyergistic damping effect.

EXAMPLE 13, COMPARATIVE EXAMPLE 7

Figure 10:
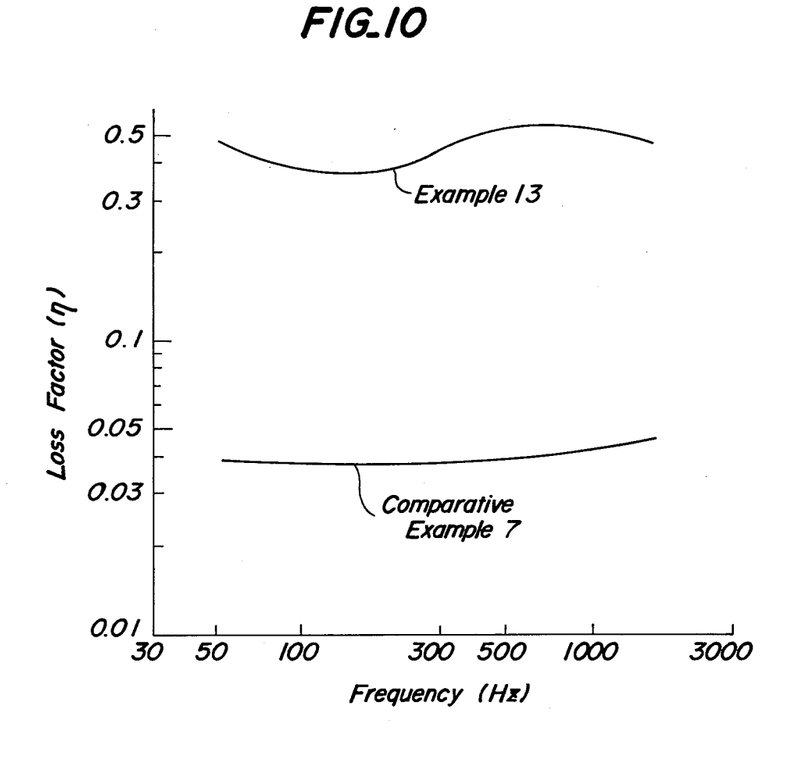

A sound damping material as shown in the following Table 6 was measured with respect to the loss factor under the same conditions as described in Example 12 to obtain a result as shown in FIG. 10.

TABLE 6

Construction of sound damping material

| | |
|---|---|
| Example 13 | thin paper ± core — tack film — thick paper[1] |
| Comparative Example 7 | thin paper ± core ± thick paper |

Note*
[1] The term "thick paper" has a thickness of 2 mm.

As apparent from FIG. 10, the loss factor is considerably improved in the case of applying the tack film to one side of the core (Example 13) as compared with the case of applying the adhesive to both sides of the core without using the tack film (Comparative Example 7).

As previously mentioned, the sound damping materials according to the invention have the following advantages:

(1) The loss factor is very large at low and middle frequency ranges;
(2) The temperature dependence of loss factor is very small;
(3) Weight-saving is easily possible as compared with the conventional sound damping material; and
(4) The reduction of cost is possible.

Therefore, it is quite natural to say that the invention refers to a new type of sound damping materials, which have never been seen in the prior art.

What is claimed is:

1. A sound damping material comprising; a composite structural body of a honeycomb or corrugated core, a plane sheet and a pressure sensitive adhesive layer, a height direction of said honeycomb or corrugated core being perpendicular to a surface of a vibrating body, and said at least one pressure sensitive adhesive layer being existent between said honeycomb or corrugated cores or between said honeycomb or corrugated core and said plane sheet and having a dynamic shearing storage modulus of $1 \times 10^3 \sim 1 \times 10^7$ dyn/cm$^2$ at 25° C. and 15 Hz.

2. A sound damping material according to claim 1, wherein said honeycomb core has a cell size of $1 \sim 100$ mm.

3. A sound damping material according to claim 1, wherein said honeycomb core has a height of not less than 1 mm.

4. A sound damping material according to claim 1, wherein said corrugated core has a height of $1 \sim 100$ mm.

5. A sound damping material according to claim 1, wherein the number of ridges in said corrugated core is $30 \sim 500$/m.

6. A sound damping material according to claim 1, wherein a weight ratio of said plain sheet to said honeycomb or corrugated core is $1/30 \sim 100$.

* * * * *